United States Patent
Raghavan et al.

(10) Patent No.: US 12,298,752 B2
(45) Date of Patent: May 13, 2025

(54) SYSTEM AND A METHOD FOR IMPLEMENTING CLOSED-LOOP MODEL PREDICTIVE CONTROL USING BAYESIAN OPTIMIZATION

(71) Applicant: Elixa Technologies Private Limited, Maharashtra (IN)

(72) Inventors: Vipin Raghavan, Maharashtra (IN); Varun Thakre, Maharashtra (IN)

(73) Assignee: Elixa Technologies Private Limited, Maharashtra (IN)

( * ) Notice: Subject to any disclaimer, the term of this patent is extended or adjusted under 35 U.S.C. 154(b) by 363 days.

(21) Appl. No.: 17/658,540

(22) Filed: Apr. 8, 2022

(65) Prior Publication Data

US 2022/0326697 A1    Oct. 13, 2022

(30) Foreign Application Priority Data

Apr. 8, 2021 (IN) .............................. 202121016621

(51) Int. Cl.
  *G05B 19/418* (2006.01)
(52) U.S. Cl.
  CPC ... *G05B 19/41885* (2013.01); *G05B 19/4183* (2013.01)
(58) Field of Classification Search
  CPC ................................................. G05B 19/4183
  See application file for complete search history.

(56) References Cited

U.S. PATENT DOCUMENTS

| 4,013,506 A | * | 3/1977 | Histed .................. | D21C 9/1052 162/49 |
|---|---|---|---|---|
| 5,672,247 A | | 9/1997 | Pangalos et al. | |

(Continued)

FOREIGN PATENT DOCUMENTS

| CA | 2265182 A1 | * | 9/1999 | ........... D21C 9/1052 |
|---|---|---|---|---|
| CN | 113110103 A | * | 7/2021 | |

(Continued)

OTHER PUBLICATIONS

Wabersich, K.P., Hewing, L., Carron, A. and Zeilinger, M.N., 2021. Probabilistic model predictive safety certification for learning-based control. *IEEE Transactions on Automatic Control*, 67(1), pp. 176-188.
Piga, D., Forgione, M., Formentin, S. and Bemporad, A., 2019. Performance-oriented model learning for data-driven MPC design. *IEEE control systems letters*, 3(3), pp. 577-582.
Rahman, M., Avelin, A., Kyprianidis, K., Jansson, J. and Dahlquist, E., 2018. Model based control and diagnostics strategies for a continuous pulp digester. *Proceedings of the TAPPI PaperCon*, Charlotte, NC, USA, pp. 15-18.

(Continued)

*Primary Examiner* — Suresh Suryawanshi
(74) *Attorney, Agent, or Firm* — Knobbe, Martens, Olson & Bear, LLP

(57) ABSTRACT

Present disclosure discloses a method and a system for optimizing a model predictive control during an industrial process control operation. The method receives, using one or more sensors, one or more input parameters from each of a plurality of processing stages involved in the industrial process control operation. The method determines a pulp brightness value of each processing stage based on the one or more input parameters. Thereafter, the method implements a model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value.

15 Claims, 4 Drawing Sheets

(56) References Cited

U.S. PATENT DOCUMENTS

| | | | |
|---|---|---|---|
| 6,833,054 B2 | 12/2004 | Lahtinen et al. | |
| 2003/0070778 A1* | 4/2003 | Lahtinen | G01N 33/343 |
| | | | 162/49 |
| 2006/0278353 A1* | 12/2006 | Ding | D21B 1/02 |
| | | | 162/49 |
| 2017/0205813 A1* | 7/2017 | Sayyarrodsari | G05B 19/41885 |
| 2022/0323969 A1 | 10/2022 | Raghavan et al. | |

FOREIGN PATENT DOCUMENTS

| | | | | |
|---|---|---|---|---|
| EP | 1302589 A2 * | 4/2003 | | D21C 9/1052 |
| EP | 3193218 A2 * | 7/2017 | | G05B 13/048 |
| EP | 3380133 A1 | 10/2018 | | |
| IN | 249688 | 11/2011 | | |
| WO | WO 97/45203 A1 | 12/1997 | | |
| WO | WO-2005042832 A1 * | 5/2005 | | D21C 9/1052 |

OTHER PUBLICATIONS

Ali, D., Hayat, M.B., Alagha, L. and Molatlhegi, O.K., 2018. An evaluation of machine learning and artificial intelligence models for predicting the flotation behavior of fine high-ash coal. Advanced Powder Technology, 29(12), pp. 3493-3506.

Kalyani, V.K., Pallavika, Chaudhuri, S., Gouri Charan, T., Haldar, D.D., Kamal, K.P., Badhe, Y.P., Tambe, S.S. and Kulkarni, B.D., 2007. Study of a laboratory-scale froth flotation process using artificial neural networks. Mineral Processing and Extractive Metallurgy Review, 29(2), pp. 130-142.

\* cited by examiner

SYSTEM AND A METHOD FOR IMPLEMENTING CLOSED-LOOP MODEL PREDICTIVE CONTROL USING BAYESIAN OPTIMIZATION

TECHNICAL FIELD

The present subject matter generally relates to a field of process-control in industries and more particularly, to a system and a method for implementing a closed-loop model predictive control using Bayesian optimization for achieving process control on a device with low computational power.

BACKGROUND

Model Predictive Control (MPC) has been widely used as a method of process control in industries such as chemical plants, oil refineries, paper and pulp, etc., which, traditionally, involves an online optimization of the control strategy over a pre-determined predictive receding horizon. It offers various advantages such as effective handling of multivariate control problems, ease of tuning and explicit consideration of constraints. A typical strategy in MPC is the following—at any given time t, the state of the plant under consideration is sampled. Using a "cost-minimizing" function, optimal values for control are computed (usually via some numerical minimization method) for a relatively short time horizon in the future, t+T. Of these, only the very first value is implemented and then the plant state is re-sampled once again in some time.

A central limitation of the said MPC-based optimization is that it requires relatively inexpensive modelling of the process. As a result, linear and some non-linear (quadratic) approximations to the plant-models are usually considered; unless, of course an explicit—usually physics-based model of the process, in the form of a partial differential equations, is readily available. However, the non-linear modeling presents a computational challenge, in that, the online numerical optimization becomes rather expensive. This still works fine for relatively low-dimensional systems. But, when the system is high-dimensional, non-linear and exhibits a multi-scale dynamical nature, not only does the approximation fail to capture the system dynamics, but also the numerical optimization becomes highly expensive, resulting in a poor control performance.

To address this challenge, recent studies have focused on "black box" or "data-driven" modelling approach. This is typically done using methods such as Neural Networks, which can potentially model complex phenomenon accurately and can be used to construct an objective function for optimization. Black-box functions are often non-convex, non-linear, noisy, and computationally expensive, which makes them unsuitable for traditionally used online numerical approaches for MPC.

Accordingly, there exists a need to device an optimization strategy which is applicable for an arbitrary black-box function, and which is derivative-free.

The information disclosed in this background of the disclosure section is for enhancement of understanding of the general background of the invention and should not be taken as an acknowledgement or any form of suggestion that this information forms the prior art already known to a person skilled in the art.

SUMMARY

Embodiments of the present disclosure may address the problems associated with process control in systems that are high-dimensional, non-linear and exhibit a multi-scale dynamical nature.

In an embodiment, there is a method for optimizing a closed-loop model predictive control for process control. The method comprises receiving, using one or more sensors, one or more input parameters from each of a plurality of processing stages involved in the industrial process control operation. The method further comprises determining a pulp brightness value of each processing stage based on the one or more input parameters. Further, the method comprises implementing a model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value.

In an embodiment, a system for optimizing a closed-loop model predictive control for process control is disclosed. The system includes a processor and a memory communicatively coupled to the processor, wherein the processor is configured to receive using one or more sensors, one or more input parameters from each of a plurality of processing stages involved in the industrial process control operation. The processor is configured to determine a pulp brightness value of each processing stage based on the one or more input parameters. Further, the processor is configured to implement a model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value.

In an embodiment, a non-transitory computer readable medium including instructions stored thereon that when processed by at least one processor cause a system to perform operations comprising receiving, using one or more sensors, one or more input parameters from each of a plurality of processing stages involved in the industrial process control operation. The instructions cause the at least one processor to determine a pulp brightness value of each processing stage based on the one or more input parameters. Further, the instructions cause the at least one processor to implement a model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. The same numbers are used throughout the figures to reference like features and components. Some embodiments of system and/or methods in accordance with embodiments of the present subject matter are now described below, by way of example only, and with reference to the accompanying figures.

Figure 1:
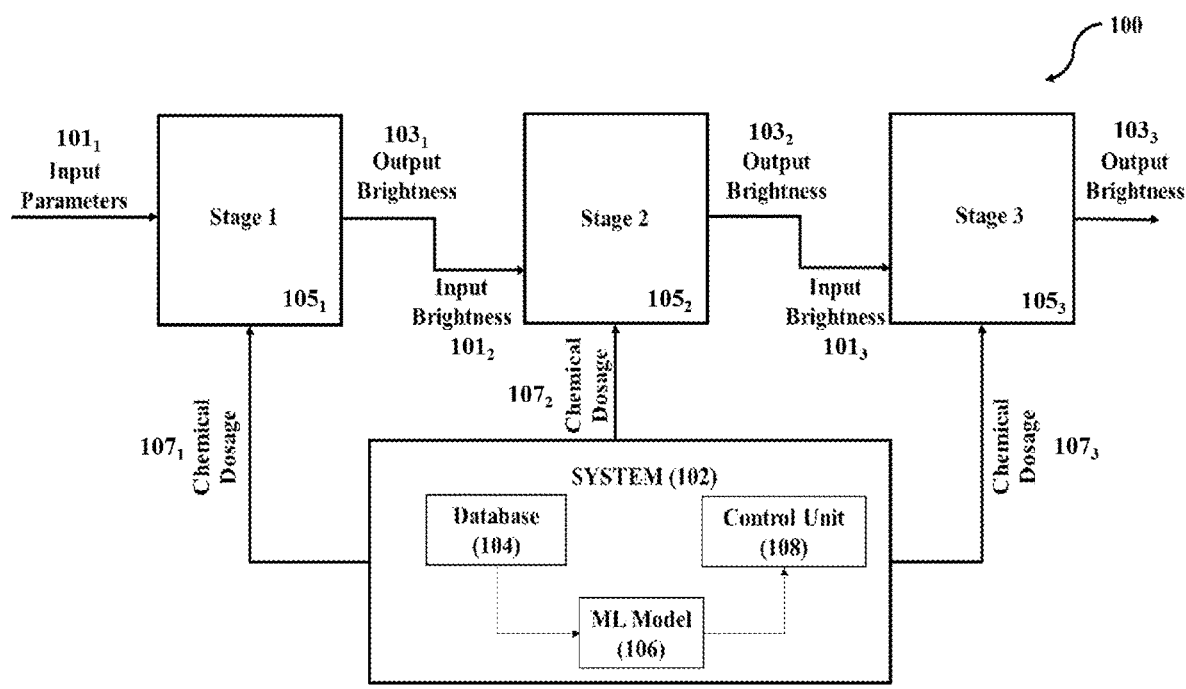
FIG. 1 illustrates a schematic diagram 100 of a process of converting wood chips to pulp with a desired output brightness in accordance with an embodiment of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of embodiments of the disclosure, reference is made to the accompanying drawings which illustrates specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Traditionally, Model Predictive Control (MPC) has been achieved by using simpler, linear approximations to the plant processes or by means of Ordinary/Partial Differential equations. Using numerical techniques, a solution to the equations is obtained and is used for computing an optimal control strategy for the variable of interest. However, if the process is a high-dimensional complex process, the task of modelling the same using differential equations is heavily tedious, and equally tedious is the computation of its solution and optimization. Furthermore, such an approximation may also fail to capture the non-linear nature of the dynamics and hence may fail to optimize the process efficiently. Consequently, data-driven approaches are used to model the processes. Typically, deep-learning methods such as Neural Networks (NN) are found to be suitable for modelling non-linear, multi-variate processes. However, Neural Networks are "black-box-functions", in that, an explicit functional form is unavailable.

Moreover, Neural Networks could be non-convex, non-linear and high-dimensional, which renders them computationally expensive and therefore rather unsuitable for use with the existing online numerical techniques. Moreover, the existing techniques look for an optimal solution within a prescribed (local) interval, which may not necessarily be the most optimal choice of the dosage. The same optimal solution could lie outside of the interval. Thus, a global search—over a wide range of values—for the optimal choice of the dosage is necessitated. Moreover, this has to be done simultaneously for three or more chemical dosages, which is equivalent to a 3-dimensional grid-search over a wide graph. This, together with the nature of Neural Networks, adds to the computational complexity if the existing techniques are used.

To address this problem, Bayesian optimization, which is a non-parametric method, is disclosed in the present disclosure to arrive at a global optimal solution. Not only is it fast, but also it is efficient, in that, the optimal solution can be empirically obtained in less than 10 iterations, for example.

In one embodiment, Bayesian optimization has been applied in order to model the process in paper and pulp industry. It may be understood by a skilled person that Bayesian optimization can be applied to model processes in various industries such as, but not limited to, chemical plants, oil refineries, coal mining and the like. In other words, the disclosed Bayesian optimization may be also used to control or optimize various parameters implemented in different types of aforementioned industries.

However, for the purpose of the explanation of the present disclosure, the paper and pulp industry example has been considered in the upcoming paragraphs of the specification. In the Paper and Pulp industry, wood chips are converted into pulp with a desired brightness that is further used for various applications such as in packaging materials. The entire process is executed in three stages viz, Impregnation stage (also, referred as Stage 1), Medium Consistency Bleaching stage (also, referred as Stage 2) and High Consistency Bleaching stage (also, referred as Stage 3). For optimal performance, at each stage, the dosage of chemicals has to be controlled in order to maintain the desired output brightness, based on the input parameters such as tank levels, temperature, pressure, inlet-brightness of the pulp, etc.

The entire process is highly non-linear with around 1500 input parameters and therefore, optimizing such a process by simple numerical techniques is next to impossible.

To model such a process, the present disclosure assumes a black-box function f, which models the plant process with a high accuracy. The input to the function is the state of the plant, sampled at an instance, say t. The output is, say, in this case, is the pulp brightness to be expected after a certain, pre-determined time gap, say t+T. Now, according to embodiments of the present disclosure, it is required to determine an optimal dosage of chemical(s) to achieve a desired brightness at time t+T, from a reasonably wide array of possible dosage choices. A straight-forward—and also computationally expensive method—of doing this is to perform a complete grid search over the full range and choose the dosage strategy closest to the desired brightness level. However, as mentioned earlier, there is possibility, that multiple dosages may satisfy the criterion, i.e., quite a few local minimas may be observed. In general, there is no way of separating those from the global minimas, computationally. This is where disclosed Bayesian optimization technique proves to be a highly useful tool.

The strategy as employed in Bayesian optimization is to place a prior over the function f, that models the behaviour of the function. After collecting the function evaluation data, the prior is updated to form a posterior distribution over f. The posterior distribution, in turn, is used to construct an acquisition function that determines the next query point. Thus, rather than performing a complete grid-search, the disclosed Bayesian optimization technique guides in the direction of the optimal solution with each iteration, making the process computationally efficient.

One drawback, however, with Bayesian optimization technique arises due to the lack of a well-defined global convergence criterion—i.e., convergence to a stationary point—and is often stopped using an artificial/externally defined criterion. As a result, the use has rather been restricted to modeling rather than for optimization. However, in MPC, this can be overcome by defining a convex quadratic objective function of the form $\lambda(f-z^{ref})^2$, where $z^{ref}$ is the level at which the output may be maintained, for instance, the brightness level according to the embodiment and $\lambda$ is an arbitrary weight fixed at 1. Being a quadratic function, it ensures convergence to a stationary point, irrespective of the convexity properties of the modelling function f. This allows for fewer iterations, resulting in faster run-time.

FIG. 1 illustrates a schematic diagram 100 of a process of converting wood chips to pulp with a desired output brightness in accordance with an embodiment of the present disclosure.

The schematic diagram 100 comprises three (processing) stages i.e., Stage 1 $105_1$, Stage 2 $105_2$ and Stage 3 $105_3$, input parameters $101_1$, input brightness $101_2$, input brightness $101_3$, output brightness $103_1$, output brightness $103_2$, output brightness $103_3$, chemical dosage $107_1$, chemical dosage $107_2$, chemical dosage $107_3$, a system 102 including a database 104, a ML model (also, referred as ML module) 106, and a control unit (also, referred as controlling module) 108. The output brightness $103_1$, is given as an input to the processing stage 2 as input brightness $101_2$. Similarly, the output brightness $103_2$, is given as an input to the processing stage 3 as input brightness $101_3$. The input parameters $101_1$ for the processing stage 1 $105_1$ comprise at least one of a tank level value and a temperature value of the processing stage 1. Similarly, the input parameters (not shown in FIG. 1) for the processing stage 2 $105_2$ comprise at least one of a tank level value and a temperature value of the processing stage 2 and the input parameters (not shown in FIG. 1) for the processing stage 3 $105_3$ comprise at least one of a tank level value and a temperature value of the processing stage 3.

FIG. 1 depicts the process of conversion of wood chips to pulp with a desired output brightness. The process is modelled using an artificial intelligence-based Machine Learning (ML) model and optimized by using Bayesian optimization. As seen in FIG. 1, the entire process for conversion of wood chips to pulp with a desired output brightness level is implemented in three stages—Stage 1, Stage 2 and Stage 3. Stage 1 is known as the Impregnator stage; Stage 2 is known as the Medium Consistency stage and Stage 3 is known as the High Consistency stage. The process at each stage is controlled by the system 102 comprising the database 104, the ML model 106 and the control unit 108. The ML model 106 is implemented at each stage to predict the chemical dosage required at each stage to achieve a desired level of brightness. The predicted chemical dosages by the ML model 106 are utilized by the control unit 108 to control the chemical dosage input at every stage. The data from real-time plants (also, referred as current data) is stored as historical data (also, referred as past data) in the database 104 which acts as a starting reference for the ML model 106. The detailed procedure is described as follows.

Using sensor-data, an optimal pulp brightness range that needs to be maintained at each stage is pre-determined. One or more sensors may be attached to each processing stage to collect input parameters of each processing stage. The input parameters comprise at least one of a tank level value and a temperature value. For instance, the input parameters $101_1$ comprise at least one of a tank level value and a temperature value of the processing stage 1. The input parameters (not shown in FIG. 1) comprise at least one of a tank level value and a temperature value of the processing stage 2. The input parameters (not shown in FIG. 1) comprise at least one of a tank level value and a temperature value of the processing stage 3. The ML model 106 controls three chemical dosages at Medium and High Consistency Stage: caustic soda/Oxidized White Liquor (OWL), Peroxide and DTPA. An optimal combination of the three chemicals is required to maintain the pulp brightness at a desired level. The ML model 106 controls the dosage of OWL at the Impregnator stage. OWL is mainly used at the Impregnator and Medium Consistency stage, along with Peroxide, as it is obtained as a by-product in the process. However, when the quality of OWL is not good, Caustic is used at both the stages.

The ML model 106 is trained on the historical data that is stored in the database 104 and runs every 5 minutes, for example. The historical data refers to one or more past input parameters from each of the plurality of processing stages involved in past industrial process control operation, a past pulp brightness value of each processing stage based on the one or more past input parameters and past chemical dosage values of the one or more chemical components at each of the plurality of processing stages based on at least one of the one or more past input parameters of the current processing stage and the pulp brightness value of the preceding stage. For instance, after receiving one or more past input parameters from each of the plurality of processing stages (from a receiving module of the system 102), the ML model 106 captures a past pulp brightness value of each processing stage based on the one or more past input parameters. Thereafter, the ML model 106 determines past chemical dosage values of the one or more chemical components at each of the plurality of processing stages based on at least one of the one or more past input parameters of the current processing stage and the pulp brightness value of the preceding stage. Further, the ML model 106 determines the chemical dosage values based on the past chemical dosage values of the one or more chemical components at each of the plurality of processing stages corresponding to target pulp brightness value. For given plant condition, the ML model 106 is trained to identify the average pulp brightness after a pre-determined time T, for the conditions, along with a combination of chemical dosages. At each stage, the plant conditions are sampled after every five minutes. The ML model 106 performs a grid-search over a 3-Dimensional (3D) grid to find the best chemical dosage combination—that minimizes a certain cost function—promising the desired pulp brightness after time T.

In stage 1, known as the Impregnator stage, the wood chips have to be softened by providing a temperature and a pH shock for further processing at later stages. The desired output brightness at this stage is 33.0% ISO. Based on the real-time input parameters, such as the tank level, temperature, current output brightness, etc., the ML model 106 checks if the current dosage of OWL is sufficient to keep the brightness within 34.0% ISO and 35% ISO. If not, then the method computes the optimal value of the OWL dosage, needed for obtaining the pulp brightness closest to 33.0% ISO as follows.

Since the Artificial Intelligence (AI) modeling the process is a black-box function, the 3D grid for chemical dosages consists of a fairly high number of points. However, instead of evaluating on the full grid, Bayesian optimization starts with a random point on the grid. This point—the trio of chemical dosages—is then supplied to the objective function, which determines if this is the optimal dosage or not. The objective function is a combination of pre-determined rules and the output of a machine learning algorithm that predicts the pulp brightness for the supplied values of chemical dosages, taking the current state of the plant into account. If all constraints are satisfied, the algorithm terminates the search right there.

After evaluating over this starting point, using a Gaussian Process Regressor places a "prior" on the outcome. In other words, it gives the best rational assessment of the probability of obtaining the pulp brightness in the desired range, for the given chemical dosage combination, along with other variables of interest. It is similar to performing a theoretical experiment. Using the prior, another function, called the "acquisition function"—which is typically an inexpensive function—determines the point where, the desirability of evaluating the black-box function f is expected to be highest for the optimization problem in consideration. The acquisition function then selects the location of the next observation. Empirically, the method hits the global minima/optimal point in less than 10 iterations. It may be noted that the pulp brightness is needed within a certain range and not an exact point. Therefore, the optimization process is halted if for continuous 3 iterations, the output value of f falls within the range. Thus, a large grid search is avoided and rather a minima is arrived at much faster and more accurately. The model is replicated at Medium and High Consistency stages.

The output brightness level of the softened wood chips from stage 1 acts as input brightness level for stage 2, known as Medium Consistency Bleaching stage. Based on the input brightness level and the reaction time—which is typically between 30-40 minutes—the ML model 106 again predicts an output brightness level that can be obtained with the current dosages. If the predicted output brightness level does not match with a desired output brightness level, the ML model 106 again provides the dosages for caustic soda/OWL, Peroxide and DTPA (diethylene triamine pentacetic acid) to be dosed so as to achieve the desired output brightness i.e., the target parameter value.

A similar procedure as described above is implemented at stage 3, known as the High Consistency Bleaching stage that results in a desired output brightness of the wood pulp.

In brief, the above-mentioned process/method of optimizing a model predictive control during an industrial process control operation may involve following steps of: receiving, using one or more sensors, one or more input parameters from each of a plurality of processing stages involved in the industrial process control operation, determining a pulp brightness value of each processing stage based on the one or more input parameters, and implementing the model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value. One or more chemical components comprises caustic soda, an OWL, a peroxide and a DTPA.

Since the entire process is modelled by ML based, data-driven modelling strategy, using Bayesian optimization which helps in achieving greater speed and accuracy by reducing the number of iterations and providing accurate chemical dosages.

Further, since the desired output brightness level is achieved by the chemical dosages that are controlled by the ML model 106—which is independent of wood-type—it allows for variation based on the type, age, and geographical location of the wood species.

In another embodiment, ML based data-driven modelling strategy using Bayesian optimization can also be used to model coal-beneficiation process in coal industry.

It may also be noted by a skilled person that ML based data-driven modelling strategy using Bayesian optimization can be used to model the processes in various other industries including but not limited to oil refineries, chemical plants and like.

Figure 2:
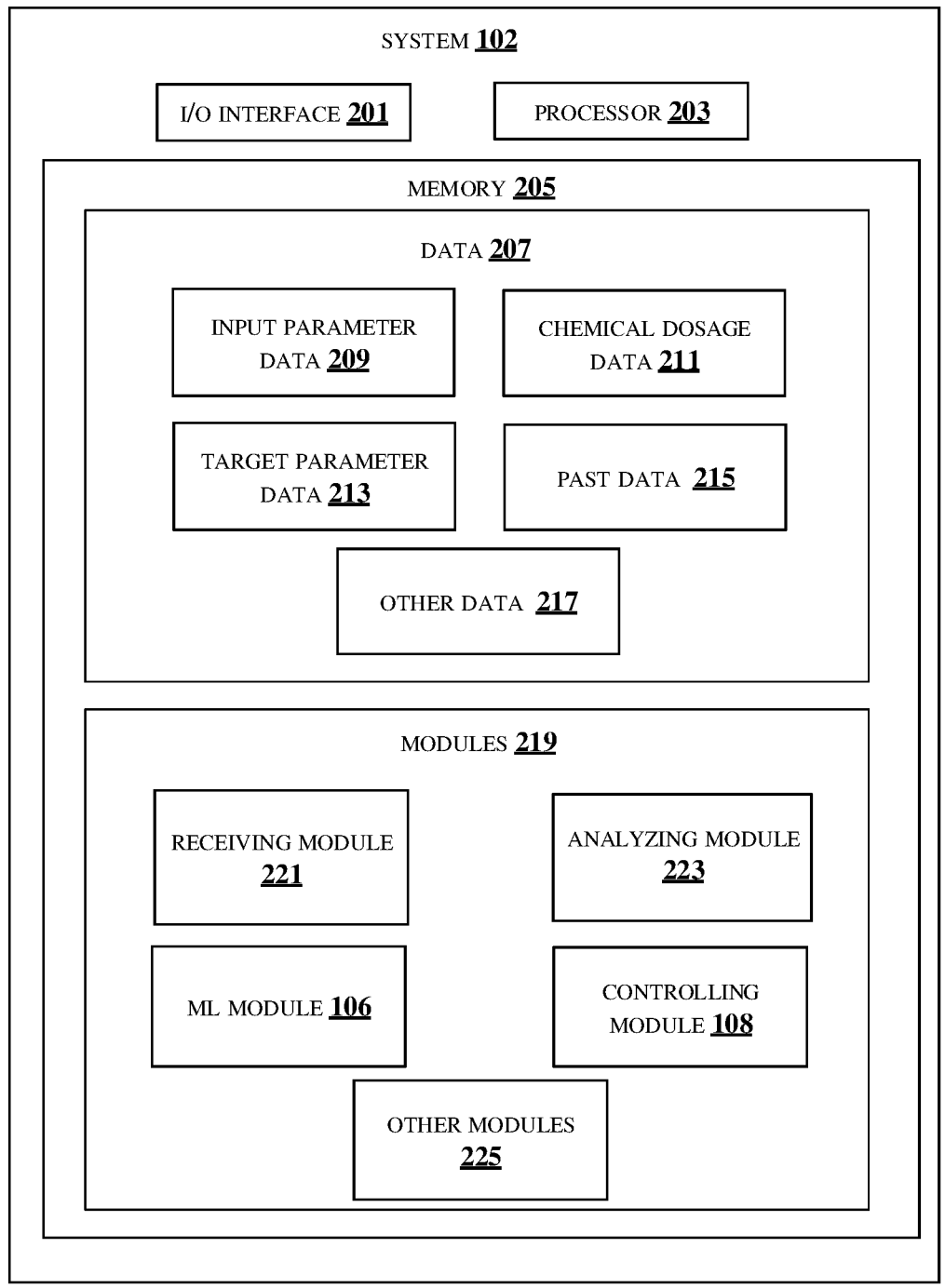
FIG. 2 shows a detailed block diagram of a system 102 in accordance with an embodiment of the present disclosure.

FIG. 2 shows a detailed block diagram of a system 102 in accordance with an embodiment of the present disclosure.

In the embodiment, the system 102 may include an Input/Output (I/O) interface 201, a processor 203 and a memory 205. The I/O interface 201 is configured to receive, using one or more sensors, one or more input parameters from each of a plurality of processing stages i.e., stage 1 $105_1$, stage 2 $105_2$ and stage 3 $105_3$ involved in the industrial process control operation. The input parameters comprise at least one of a tank level value and a temperature value. During training of the model on historical data, the I/O interface 201 is configured to receive one or more past input parameters from each of the plurality of processing stages ($105_1$, $105_2$, $105_3$) involved in past industrial process control operation, a past pulp brightness value of each processing stage based on the one or more past input parameters and past chemical dosage values of the one or more chemical components at each of the plurality of processing stages. The I/O interface 201 may employ communication protocols/methods such as, without limitation, audio, analog, digital, monoaural, Radio Corporation of America (RCA) connector, stereo, IEEE®-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI®), Radio Frequency (RF) antennas, S-Video, Video Graphics Array (VGA), IEEE® 802.11b/g/n/x, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

The one or more input parameters, the one or more past input parameters, the past pulp brightness value and the past chemical dosage values received by the I/O interface 201 are stored in the memory 205. The memory 205 is communicatively coupled to the processor 203 of the system 102. The memory 205, also, stores processor-executable instructions which may cause the processor 203 to execute the instructions for optimizing a model predictive control during an industrial process control operation. The memory 205 includes, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 203 includes at least one data processor for optimizing a model predictive control during an industrial process control operation. The processor 203 may include specialized processing units such as integrated system (bus) controllers, memory management control units, floating point units, graphics processing units, digital signal processing units, etc.

In one embodiment, the database 104 stores historical data comprising the one or more past input parameters, the past pulp brightness value of each processing stage based on the one or more past input parameters and the past chemical dosage values of the one or more chemical components. The database is updated at pre-defined intervals of time. These updates relate to input parameters, pulp brightness value and chemical dosage values corresponding to one of processing stages.

The system 102, in addition to the I/O interface 201 and processor 203 described above, includes data 207 and one or more modules 219, which are described herein in detail. In the embodiment, the data 207 may be stored within the memory 205. The data 207 include, for example, input parameter data 209, chemical dosage data 211, target parameter data 213, past data 215 and other data 217.

The input parameter data 209 includes at least one of a tank level value and a temperature value from one of the processing stages $105_1$, $105_2$, $105_3$.

The chemical dosage data 211 includes a current chemical dosage value $107_1$, $107_2$, $107_3$ of at least one of a caustic soda, an Oxidized White Liquor (OWL), a peroxide and a Diethylenetriamine pentaacetate (DTPA).

The target parameter data 213 includes a target pulp brightness value.

The past data 215 (also, referred as historical data 215) includes one or more past input parameters, a past pulp brightness value of each processing stage based on the one or more past input parameters and the past chemical dosage values of the one or more chemical components at each of the plurality of processing stages.

The other data 217 stores data, including temporary data and temporary files, generated by one or more modules 219 for performing the various functions of the system 102.

In the embodiment, the data 207 in the memory 205 are processed by the one or more modules 219 present within the memory 205 of the system 102. In the embodiment, the one or more modules 219 are implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 219 are communicatively coupled to the processor 203 for performing one or more functions of the system 102. The said modules 219 when configured with the functionality defined in the present disclosure results in a novel hardware.

In one implementation, the one or more modules 219 include, but are not limited to, a receiving module 221, an analyzing module 223, a ML module 106 and a controlling module 108. The one or more modules 219, also, includes other modules 225 to perform various miscellaneous functionalities of the system 102.

The receiving module 221: the receiving module 221 of the system 102 receives, using one or more sensors, one or more input parameters from each of a plurality of processing stages $105_1$, $105_2$, $105_3$ involved in the industrial process control operation. The input parameters comprise at least one of a tank level value and a temperature value. During generation of a model trained on historical data, the receiving module 221 of the system 102 receives one or more past input parameters from each of the plurality of processing stages $105_1$, $105_2$, $105_3$ involved in past industrial process control operation.

The analyzing module 223: the analyzing module 223 of the system 102 determines a pulp brightness value of each processing stage based on the one or more input parameters.

The controlling module 108: the controlling module 108 may also be referred as a control unit 108 (shown in FIG. 1). The controlling module 108 of the system 102 implements a model trained on historical data, based on the determining, for controlling chemical dosage values $107_1$, $107_2$, $107_3$ of one or more chemical components at each of the plurality of processing stages such that an amount of the chemical dosage to be injected is determined based on at least one of the one or more input parameters of a current processing stage and the pulp brightness value of preceding processing stage.

The ML module 106: During generation of the model trained on historical data, the ML module 106 of the system 102 captures a past pulp brightness value of each processing stage based on the one or more past input parameters. Thereafter, the ML module 106 of the system determines past chemical dosage values of the one or more chemical components at each of the plurality of processing stages based on at least one of the one or more past input parameters of the current processing stage and the pulp brightness value of the preceding stage. Subsequently, the ML module 106 of the system 102 determines the chemical dosage values based on the past chemical dosage values of the one or more chemical components at each of the plurality of processing stages corresponding to target pulp brightness value. The ML module 106 of the system 102 trains the model using a neural network technique and Bayesian optimization technique.

Figure 3A:
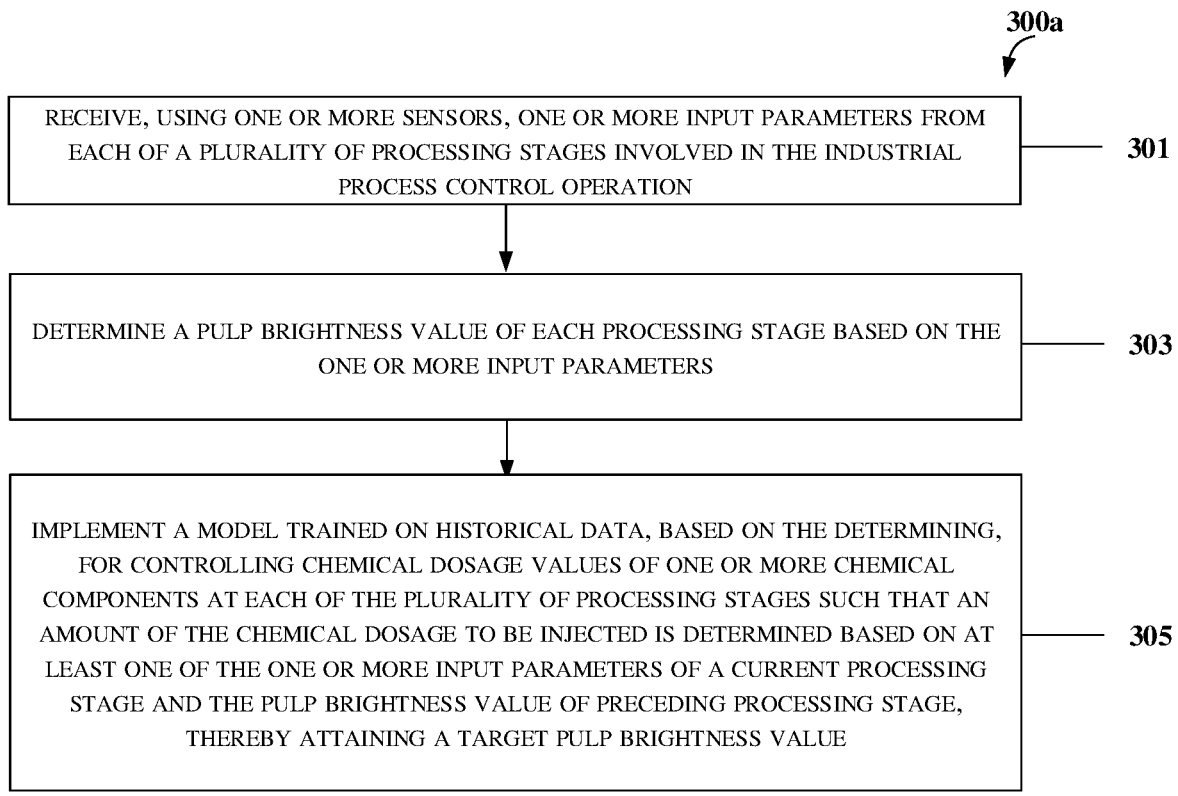
FIGS. 3a and 3b illustrate flowcharts showing a method of optimizing a model predictive control during an industrial process control operation in accordance with an embodiment of present disclosure.
Figure 3B:
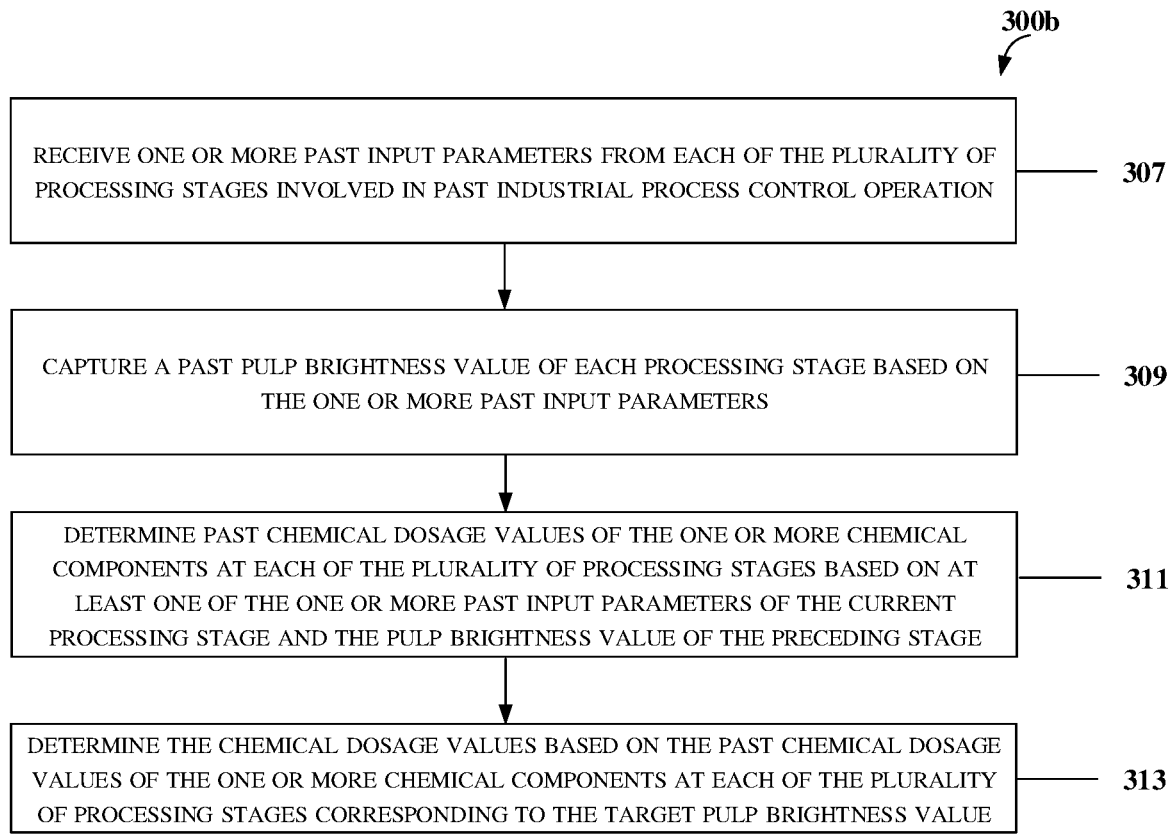

FIGS. 3a and 3b illustrate flowcharts showing a method of optimizing a model predictive control during an industrial process control operation in accordance with an embodiment of present disclosure.

As illustrated in FIG. 3a, the method 300a includes one or more blocks for optimizing a model predictive control during an industrial process control operation. The method 300a may be described in the general context of computer executable instructions. Generally, computer executable instructions can include routines, programs, objects, components, data structures, procedures, modules, and functions, which perform particular functions or implement particular abstract data types.

The order in which the method 300a is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the receiving module 221 of the system 102 may receive, using one or more sensors, one or more input parameters from each of a plurality of processing stages $105_1$, $105_2$, $105_3$ involved in the industrial process control operation. The input parameters may comprise at least one of a tank level value and a temperature value.

At block 303, the analyzing module 223 of the system 102 may determine a pulp brightness value of each processing stage based on the one or more input parameters.

At block 305, the controlling module 108 of the system 102 may implement a model trained on historical data, based on the determining, for controlling chemical dosage values ($107_1$, $107_2$, $107_3$) of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value. The one or more chemical components may comprise caustic soda, an Oxidized White Liquor (OWL), a peroxide and a Diethylenetriamine pentaacetate (DTPA).

As illustrated in FIG. 3b, the method 300b includes one or more blocks for generating the model trained on historical data implemented at block 305. The method 300b may be described in the general context of computer executable instructions. Generally, computer executable instructions can include routines, programs, objects, components, data structures, procedures, modules, and functions, which perform particular functions or implement particular abstract data types.

The order in which the method 300b is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 307, the receiving module 221 of the system 102 may receive one or more past input parameters from each of the plurality of processing stages ($105_1$, $105_2$, $105_3$) involved in past industrial process control operation.

At block 309, the ML module 106 of the system 102 may capture a past pulp brightness value of each processing stage based on the one or more past input parameters.

At block 311, the ML module 106 of the system 102 may determine past chemical dosage values of the one or more chemical components at each of the plurality of processing stages based on at least one of the one or more past input parameters of the current processing stage and the pulp brightness value of the preceding stage.

At block 313, the ML module 106 of the system 102 may determine the chemical dosage values based on the past chemical dosage values of the one or more chemical components at each of the plurality of processing stages corresponding to target pulp brightness value. The ML module 106 of the system 102 may train the model using a neural network technique and Bayesian optimization technique.

Some of the advantages of the present disclosure are listed below.

Since the entire process control is modelled by ML based and data-driven modelling strategy using Bayesian optimization, the approach presented in the present disclosure helps in achieving greater speed and accuracy by reducing the number of iterations and providing accurate chemical dosages.

Since the desired output brightness level is achieved by the chemical dosages that are controlled by the ML model 106—which is independent of wood-type—it allows for variation based on the type, age, and geographical location of the wood species.

The present disclosure uses ML and Bayesian optimization technique to continuously achieve optimal values of current chemical dosage values. This approach allows maximizing the efficiency of a closed-loop model predictive control for process control.

The present disclosure performs analysis and implements a model trained on historical data for process control without any human intervention.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3a and 3b show certain events occurring in a certain order. In alternative embodiments, certain operations may be performed in a different order, modified or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERRAL NUMERALS

| Reference number | Description |
|---|---|
| $101_1$ | Input parameters |
| $101_2, 101_3$ | Input brightness |
| 102 | System |
| $103_1, 103_2, 103_3$ | Output brightness |
| 104 | Database |
| $105_1, 105_2, 105_3$ | Processing stages 1, 2 and 3 |
| 106 | ML model/ML module |
| $107_1, 107_2, 107_3$ | Chemical dosage |
| 108 | Control unit/Controlling module |
| 201 | I/O interface |
| 203 | Processor |
| 205 | Memory |
| 207 | Data |
| 209 | Input parameter data |
| 211 | Chemical dosage data |
| 213 | Target parameter data |
| 215 | Past data |
| 217 | Other data |
| 219 | Modules |
| 221 | Receiving module |
| 223 | Analyzing module |
| 225 | Other modules |

We claim:

1. A method of optimizing a model predictive control during an industrial process control operation, the method comprising:
receiving, using one or more sensors, one or more input parameters from each of a plurality of processing stages involved in the industrial process control operation;
determining a pulp brightness value of each processing stage based on the one or more input parameters; and
implementing a model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value,
wherein the one or more input parameters comprise a tank level value.

2. The method as claimed in claim 1, wherein the input parameters comprise a temperature value.

3. The method as claimed in claim 1, wherein the one or more chemical components comprises caustic soda, an Oxidized White Liquor (OWL), a peroxide and a Diethylenetriamine pentaacetate (DTPA).

4. The method as claimed in claim 1, wherein the model trained on historical data is generated by:
receiving one or more past input parameters from each of the plurality of processing stages involved in past industrial process control operation;
capturing a past pulp brightness value of each processing stage based on the one or more past input parameters;
determining past chemical dosage values of the one or more chemical components at each of the plurality of processing stages based on at least one of the one or more past input parameters of the current processing stage and the pulp brightness value of the preceding stage; and
determining the chemical dosage values based on the past chemical dosage values of the one or more chemical components at each of the plurality of processing stages corresponding to the target pulp brightness value.

5. The method as claimed in claim 1, wherein the model is trained using a neural technique and Bayesian optimization technique.

6. A system for optimizing a closed-loop model predictive control for process control, the system comprising:
a processor; and
a memory communicatively coupled to the processor, wherein the processor is configured to:
receive using one or more sensors, one or more input parameters from each of a plurality of processing stages involved in an industrial process control operation;
determine a pulp brightness value of each processing stage based on the one or more input parameters; and
implement a model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value,
wherein the one or more input parameters comprise a tank level value.

7. The system as claimed in claim 6, wherein the input parameters comprise a temperature value.

8. The system as claimed in claim 6, wherein the one or more chemical components comprises caustic soda, an Oxidized White Liquor (OWL), a peroxide and a Diethylenetriamine pentaacetate (DTPA).

9. The system as claimed in claim 6, wherein the processor is configured to:
receive one or more past input parameters from each of the plurality of processing stages involved in past industrial process control operation;
capture a past pulp brightness value of each processing stage based on the one or more past input parameters;
determine past chemical dosage values of the one or more chemical components at each of the plurality of processing stages based on at least one of the one or more past input parameters of the current processing stage and the pulp brightness value of the preceding stage; and
determine the chemical dosage values based on the past chemical dosage values of the one or more chemical components at each of the plurality of processing stages corresponding to the target pulp brightness value.

10. The system as claimed in claim 6, wherein the model is trained using a neural technique and Bayesian optimization technique.

11. A non-transitory computer readable medium including instructions stored thereon that when processed by at least one processor cause a system to perform operations comprising:

receiving, using one or more sensors, one or more input parameters from each of a plurality of processing stages involved in an industrial process control operation;

determining a pulp brightness value of each processing stage based on the one or more input parameters; and implementing a model trained on historical data, based on the determining, for controlling chemical dosage values of one or more chemical components at each of the plurality of processing stages such that an amount of the chemical dosage to be injected is determined based on at least one of the one or more input parameters of a current processing stage and the pulp brightness value of preceding processing stage, thereby attaining a target pulp brightness value, wherein the one or more input parameters comprise a tank level value.

12. The medium as claimed in claim 11, wherein the input parameters comprise a temperature value.

13. The medium as claimed in claim 11, wherein the one or more chemical components comprises caustic soda, an Oxidized White Liquor (OWL), a peroxide and a Diethylenetriamine pentaacetate (DTPA).

14. The medium as claimed in claim 11, wherein the instructions when processed by the at least one processor cause the system to perform operations comprising:

receiving one or more past input parameters from each of the plurality of processing stages involved in past industrial process control operation;

capturing a past pulp brightness value of each processing stage based on the one or more past input parameters;

determining past chemical dosage values of the one or more chemical components at each of the plurality of processing stages based on at least one of the one or more past input parameters of the current processing stage and the pulp brightness value of the preceding stage; and determining the chemical dosage values based on the past chemical dosage values of the one or more chemical components at each of the plurality of processing stages corresponding to the target pulp brightness value.

15. The medium as claimed in claim 11, wherein the model is trained using a neural technique and Bayesian optimization technique.

* * * * *